United States Patent [19]
Nishimura et al.

[11] Patent Number: 5,474,836
[45] Date of Patent: Dec. 12, 1995

[54] POLYESTER FILAMENT WOVEN FABRIC FOR AIR BAGS

[75] Inventors: Kunio Nishimura; Shiro Kumakawa, both of Ibaraki; Hideo Nakagawa, Takatsuki, all of Japan

[73] Assignee: Teijin Limited, Osaka, Japan

[21] Appl. No.: 177,444

[22] Filed: Jan. 5, 1994

[30] Foreign Application Priority Data

| Jan. 6, 1993 | [JP] | Japan | 5-015847 |
| Feb. 26, 1993 | [JP] | Japan | 5-061213 |
| Feb. 26, 1993 | [JP] | Japan | 5-061214 |
| Feb. 26, 1993 | [JP] | Japan | 5-061215 |

[51] Int. Cl.⁶ .......................... B60R 21/16; B32B 5/16; D03D 3/00
[52] U.S. Cl. ...................... 428/229; 280/728.1; 428/240
[58] Field of Search ................... 428/229, 225, 428/240; 280/728 R

[56] References Cited

U.S. PATENT DOCUMENTS

| 4,921,735 | 5/1990 | Bloch. | |
| 4,977,016 | 12/1990 | Thornton et al.. | |
| 5,010,663 | 4/1991 | Thornton et al.. | |
| 5,073,418 | 12/1991 | Thornton et al. | 428/229 |
| 5,236,775 | 8/1993 | Swoboda et al. | 428/225 |
| 5,296,278 | 3/1994 | Nishimura et al. | 428/229 |

FOREIGN PATENT DOCUMENTS

| 974745 | 9/1975 | Canada. |
| 0080906 | 6/1983 | European Pat. Off.. |
| 0314867 | 5/1989 | European Pat. Off.. |
| 0442373 | 8/1991 | European Pat. Off.. |
| 3137245 | 6/1991 | Japan. |
| 5195419 | of 1993 | Japan. |

OTHER PUBLICATIONS

Patent Abstracts of Japan, vol. 8, No. 182 (M–319)22 Aug. 1984 & JP–A–59075804 (Bridgestone).

*Primary Examiner*—James D. Withers
*Attorney, Agent, or Firm*—Burgess, Ryan and Wayne

[57] ABSTRACT

A non-coated and uncalendered polyester filament woven fabric useful for an air bag, having a low air permeability even after a dry or wet heat aging, includes a plurality of polyester multifilament warp and weft yarns having (1) a maximum thermal stress of 0.8 g/denier or less determined between room temperature and the melting point of the yarns, at a heating rate of 150° C./min and at a fixed length of the yarn under an initial load of 0.08 g/denier, (2) a maximum thermal shrinkage of 25% or less determined between room temperature and the melting temperature of the yarn at a heating rate of 150° C./min under an initial load of 0.08 g/denier without restricting the shrinkage of the yarns, (3) a limiting viscosity number of 0.80 to 0.95 dl/g determined in a concentration of 1.2 g/100 ml in o-chlorophenol at 25° C., and (4) a content of terminal carboxyl groups of 5 to 35 equivalent per ton.

8 Claims, No Drawings

POLYESTER FILAMENT WOVEN FABRIC FOR AIR BAGS

BACKGROUND OF THE INVENTION

1. Field of the Invention

The present invention relates to a non-coated polyester filament woven fabric for air bags. More particularly, the present invention relates to a non-coated polyester filament woven fabric useful for providing air bags for an automobile or aircraft having a very low gas-permeability even after a dry heat-aging over a long period of time, an excellent resistance to breakage even when the automobile or aircraft violently crashes, a superior functionality for safety and protection of an occupant in the automobile or aircraft from burns.

2. Description of Related Art

Air bags for automobiles and aircrafts are required to sufficiently protect occupants in the automobile or aircraft from shock when the automobile or aircraft crashes. Also, the air bags are required to present no risk of burns caused by inflation gas introduced thereinto and to have a high resistance to breakage when the automobile or aircraft crashes.

In order to provide an air bag with no risk of imparting burns to an occupant, it is necessary to reduce air permeability of the air bag-forming woven fabric. Also, in order to provide an air bag having a high resistance to breakage, it is necessary that the air bag-forming woven fabric has a high tensile strength, a high ultimate elongation, and a high burst strength.

Canadian Patent No. 974,745 discloses a non-coated, non-calendered nylon filament woven fabric for air bags. However, the resultant air bags produced from the above-mentioned nylon fabric exhibit an unsatisfactory air permeability and burst strength, because in this woven fabric, the yarn densities in warps and wefts are greatly different from each other and a tenter frame which causes a large residual strain and stress to remain on the fabric, was used.

For example, Japanese Unexamined Patent Publication (Kokai) No. 3-137,245 discloses a non-calendered, non-coated nylon 66 filament woven fabric usable for air bags. This woven fabric may have a low air permeability of 10 liters/dm$^2$/min (about 0.4 ml/cm$^2$/sec/0.5 inch Aq) or less determined under a pressure of 500 Pa, by applying a scouring procedure and a heat treatment thereto. In an example of the above-mentioned Japanese publication, a nylon 66 filament woven fabric having an air permeability of 3.4 liters/dm$^2$/min (about 0.14 ml/cm$^2$/sec/0.5 inch Aq) is disclosed. Also, this Japanese Publication discloses a woven fabric having a tensile strength of 2,300 to 3,300N/5 cm (about 141 to 202 kg/3 cm). However, the above-mentioned Japanese Publication is completely silent as to the durability of the air permeability and the burst strength of the air bag over a long period of time.

As a typical example of conventional non-coated polyester filament woven fabrics for air bags, U.S. Pat. No. 4,977,016 (Japanese Unexamined Patent Publication (Kokai) No. 4-2,835) discloses a non-coated polyester filament woven fabric not coated or not impregnated with a resin and having an air permeability of 0.5 ml/cm$^2$/sec/0.5 inch Aq or less.

Also, U.S. Pat. No. 5,010,663 (Japanese Unexamined Patent Publication (Kokai) No. 4-2,835) discloses a non-coated polyester filament woven fabric having an air permeability of 1.5 ml/cm$^2$/sec/0.5 inch Aq or less. In the above-mentioned publications, it is disclosed that since the polyester filaments have a low moisture absorption, when the polyester filament woven fabric is calendered, the calendered polyester filament woven fabric exhibits a poor recovery in bulkiness and a small change in air permeability in comparison with conventional calendered nylon filament woven fabric. However, the above-mentioned publications are completely silent as to particular means for more stabilizing the air permeability of the polyester filament woven fabric after dry or wet heat-aging over a long period of time. Also, these publications are silent as to the burst strength and durability of the fabrics. U.S. Pat. No. 4,921,735 (Japanese Unexamined Patent Publication (Kokai) No. 1-122,752) discloses a calendered non-coated polyester filament woven fabric for air bags having an air permeability of 0 to 0.53 ml/cm$^2$/sec/0.5 inch Aq. Nevertheless, this patent does not completely teach or suggest particular means for stabilizing the air permeability and the burst strength of the fabric after dry or wet heat-aging over a long period of time.

EP-A-0,442,373 discloses a non-coated, non-calendered polyester filament woven fabric which exhibits an ultimate elongation of 25% or more even when scouring and heat-setting treatments are applied thereto. In examples of the European publication, the resultant non-coated, non-calendered woven fabric realized an air permeability of 4.7 to 9.4 liters/dm$^2$/min (about 0.12 to 0.23 ml/cm$^2$/sec/0.5 inch Aq). However, the European publication is completely silent as to the stability in air permeability and burst strength of the woven fabric after dry or wet heat-aging over a long period of time.

When an air bag made from a conventional polyester filament woven fabric is left in a folded form in an automobile or aircraft over a long period of time during which the air bag is exposed several times to a high temperature and a high humidity, for example, in the summer and/or rainy seasons, the air permeability of the aged air bag is significantly increased from the initial air permeability thereof, as occurred in conventional air bags made from nylon 66 filament woven fabrics, and thus when an inflation gas is blown into the aged air bag, the amount of the inflation gas permeated through the air bag is increased and the inner pressure of the inflated air bag sometimes cannot reach a desired level. If the inner pressure of the inflated air bag is not sufficiently high, the air bag cannot exhibit a satisfactorily high shock-absorbing effect for the occupant in the automobile or aircraft, and thus the occupant is damaged upon crashing. Also, if the amount of the inflation gas leaked through the air bag is increased, the risk of burning the face of the occupant brought into contact with the air bag upon crashing is increased. Accordingly, it is important that the gas permeability of the air bag be maintained unchanged at a low level even if the air bag is aged in a dry or wet condition at a high temperature over a long period of time.

If the burst strength retention of a woven fabric is poor, and the resultant air bag is stored for a long period of time in an automobile or aircraft, the stored air bag sometimes exhibits a reduced burst strength and thus may be broken when a high pressure inflation is applied to the air bag.

Accordingly, it is important that the burst strength of the air bag be maintained unchanged at a high level even when the air bag is in a dry or wet condition at a high temperature over a long period of time.

Accordingly, it has been strongly demanded over a long time to provide a non-coated woven fabric for air bags which exhibits a satisfactory durability or persistency in air permeability and burst strength even after storage thereof under strict conditions for a long period of time.

SUMMARY OF THE INVENTION

An object of the present invention is to provide a non-coated and uncalendered polyester filament woven fabric for air bags having an excellent durability in air permeability and burst strength over a long period of time even after aging at a high temperature in a dry or wet condition.

The above-mentioned objects can be attained by the non-coated and uncalendered polyester filament woven fabric of the present invention for air bag, comprising a plurality of polyester multifilament warp and weft yarns respectively and independently from each other having (1) a maximum thermal stress of 0.8 g/denier or less determined by heating a specimen yarn fixed to a length of 50 mm from room temperature to a melting temperature of the yarn, under an initial load of 0.08 g/denier at a heating rate of 150° C./minute, (2) a maximum thermal shrinkage of 25% or less determined by heating a specimen yarn having a length of 50 mm from room temperature to the melting temperature of the yarn under an initial load of 0.08 g/denier at a heating rate of 150° C./minute without restricting the thermal shrinkage of the specimen yarn, (3) a limiting viscosity number of from 0.80 to 0.95 dl/g determined in a concentration of 1.2 g/100 ml in o-chlorophenol at a temperature of 25° C. and (4) a content of terminal carboxyl groups of 5 to 35 equivalent per ton.

The non coated and uncalendered polyester filament woven fabric of the present invention for air bags preferably has an air permeability of 0.5 ml/cm$^2$/sec/0.5 inch Aq or less, determined after dry heat-aging at a temperature of 120° C. for 500 hours, and a retention of burst strength of 70% or more determined in such a manner that the woven fabric is cut into two circular pieces having a diameter of 700 mm; the circular pieces are superimposed on each other; the circular edge portions of the superimposed pieces are joined together by double thread chain stitches so as to form a circular seam having a diameter of 670 mm and concentric with respect to the superimposed circular pieces, to form a circular bag; the bag is dry heat-aged at a temperature of 120° C. for 500 hours or wet heat-aged at a temperature of 85° C. at a relative humidity of 95% for 500 hours; a circular hole having a diameter of 106 mm is formed at the center of one side piece of the aged bag, 40 liters of a high pressure air compressed under a pressure of 40 kg/cm$^2$G are blown in an instant into the bag through the center hole to measure a burst strength of the aged bag; and the retention of burst strength of the woven fabric is represented by a ratio in % of the burst strength of the aged bag to that of a non-aged bag.

Further, the polyester filament woven fabric of the present invention for air bags preferably one produced by weaving a plurality of polyester multifilament warp and weft yarns having, respectively and independently from each other, a thermal shrinkage of 3 to 13% at a temperature of 150° C., to provide a gray woven fabric having cover factors in the warp and weft directions of from 1,000 to 1,200 and a difference of 200 or less between the cover factor in the warp direction and that in the weft direction; and dry heat-setting the woven fabric by bringing it into contact with a heat-setting metal roller surface under tension to such an extent that the resultant heat-set woven fabric exhibits an air permeability of 0.5 ml/cm$^2$/sec/0.5 inch Aq or less.

DESCRIPTION OF PREFERRED EMBODIMENTS

In the air bag or the non-coated and uncalendered polyester filament woven fabric immediately before being formed into the air bag, the polyester multifilament warp and weft yarns must have, respectively and independently from each other, a maximum heat stress of 0.8 g/denier or less and a maximum thermal shrinkage of 25% or less, when heated from room temperature to a melting temperature of the yarns.

The maximum heat stress of the yarns is determined in such a manner that a specimen yarn is taken out from the air bag or woven fabric, cut into a length of 50 mm, and fixed at this length under an initial load of 0.08 g/denier; the temperature of the specimen yarn is raised from room temperature to the melting temperature of the specimen yarn at a heating rate of 150° C./minute; a maximum thermal shrinking stress of the specimen yarn is measured, while not allowing the specimen yarn to thermally shrink; and the maximum heat stress of the specimen yarn is represented by a value in g/denier obtained by dividing the measured maximum thermal shrinking stress by denier of the specimen yarn.

The maximum thermal shrinkage of the yarns is determined in such a manner that a specimen yarn is taken out from the air bag or woven fabric, cut into a length of 50 mm and tensed under an initial load of 0.08 g/denier; the temperature of the specimen yarn is raised from room temperature to a melting temperature of the specimen yarn at a heating rate of 150° C./minute; and a maximum thermal shrinkage of the specimen yarn is measured without restricting the thermal shrinkage of the specimen yarn. The maximum heat stress and the maximum thermal shrinkage of the polyester multifilament yarns appear at a temperature of from 240° C. to 260° C.

If the maximum heat stress of the yarns is more than 0.8 g/denier, the air permeability of the resultant woven fabric undesirably increases to a level higher than 0.5 ml/cm$^2$/sec/ 0.5 inch Aq after dry heat-aging at a temperature of 120° C. for 500 hours.

In the woven fabric for air bags having a high yarn density, the yarns are brought into strong contact with each other and are restricted in movement from each other. However, in fact, the restriction in movement is applied only to individual filaments located in the yarn surface portions in direct contact with each other. Therefore, even if the thermal shrinkage is small, if the heat stress of the yarns is high, the individual filaments located in portions of the yarns, which portions do not directly contact with each other, can relatively freely shrink by overcoming the above-mentioned restriction. As a result, the individual filaments located in the surface portions of the yarns which are directly contacted with each other, and are restricted in shrinkage, cause the surface portions of the yarns to be bulky. This phenomenon causes the close contact of the yarns to each other in the woven fabric to be decreased and the yarns to be separated from each other, and thus the air permeability of the woven fabric undesirably increases. The maximum heat stress is preferably 0.6 g/denier or less, more preferably 0.5 g/denier or less.

When the maximum thermal shrinkage is more than 25%, the air permeability of the woven fabric after dry heat-aging at a temperature of 120° C. for 500 hours undesirably increases to a level higher than 0.5 ml/cm$^2$/sec/0.5 inch Aq. Even if the maximum heat stress is satisfactorily low, if the maximum thermal shrinkage is excessively high, the individual filaments located in portions of the yarns which do not directly contact each other can be freely shrunk, in the same manner as mentioned above. Therefore, the surface portions of the yarns which are in direct contact with each other get an enhanced bulkiness and are separated from each other so as to increase the air permeability of the woven fabric. The maximum thermal shrinkage is preferably 20% or less, more preferably 18% or less.

Even when a yarn has a low heat stress, the yarn does not always exhibit a low thermal shrinkage. Also, a low thermal shrinkage of the yarn does not always cause a low heat stress of the yarn. To enable the air bag to exhibit a high stability in thermal shrinkage, the warp and weft yarns in the air bag must exhibit both the low maximum heat stress of 0.8 g/denier or less and the low maximum thermal shrinkage of 25% or less.

In the polyester filament woven fabric of the present invention, preferably, the polyester multifilament warp and weft yarns respectively and independently from each other, must have a limiting viscosity number of 0.8 to 0.95 dl/g determined in a concentration of 1.2 g/100 ml in o-chlorophenol at a temperature of 25° C.

When the limiting viscosity number of the polyester resin is less than 0.80 or less, the resultant polyester multifilament yarns sometimes exhibit an unsatisfactorily low dry heat or wet heat resistance, and thus the maximum heat stress and the maximum thermal shrinkage of the polyester multifilament yarns and the air permeability of the resultant air bag after the dry heat-aging are undesirably increased, and the retention of burst strength of the resultant air bag after the dry heat or wet heat aging is undesirably reduced.

Also, when the limiting viscosity number is more than 0.95, the resultant polyester multifilament yarns sometimes exhibit an undesirably lowered mechanical strength and thus the resultant air bag exhibits an undesirably poor durability in burst strength. Preferably, the limiting viscosity number of the polyester multifilament yarns is restricted to a level of from 0.82 to 0.90 dl/g. The polyester multifilament yarns having a limiting viscosity number of 0.82 to 0.90 can be produced by appropriately controlling polymerization conditions and melt-spinning conditions.

In the polyester filament woven fabric of the present invention, the polyester multifilament warp and weft multifilament yarns respectively and independently from each other, have a content of terminal carboxyl groups of 5 to 35 equivalent per ton. When the content of the terminal carboxyl group is less than 5 equivalent per ton, the resultant polyester multifilament yarns sometimes have a reduced evenness in thickness and mechanical properties. Also, when the terminal carboxyl group content is more than 35 equivalent per ton, the resultant polyester multifilament yarns sometimes exhibit a reduced dry heat or wet heat resistance, and the resultant woven fabric exhibits an undesirably enhanced air permeability after the dry heat aging and an undesirably reduced retention of burst strength after the dry or wet heat-aging. Preferably, the terminal carboxyl group content is restricted to a level of from 7 to 30 equivalent per ton, still more preferably from 10 to 25 equivalent per ton. The polyester multifilament yarns having a terminal carboxyl group content of 5 to 35 equivalent per ton can be produced by appropriately controlling polymerization conditions and melt-spinning conditions.

Preferably, the polyester multifilament warp and weft yarns for the woven fabric of the present invention, respectively and independently from each other, have a content of residual diethylene glycol of 0.1 to 1.5% by weight.

When the residual diethylene glycol content is less than 0.1% by weight, the resultant polyester multifilament yarns sometimes exhibit an undesirably reduced softness and flexibility, and thus the resultant air bag exhibits a reduced retention of burst strength. Also, when the residual diethylene glycol content is more than 1.5% by weight, the resultant polyester multifilament yarns sometimes exhibit a reduced dry or wet heat resistance and thus an undesirably enhanced maximum thermal shrinkage, and the resultant air bag exhibits an undesirably enhanced air permeability after the dry heat aging, and an un desirably reduced retention of burst strength after the dry or wet heat aging. More preferably, the residual diethylene glycol content of the polyester multifilament yarns is restricted to a level of from 0.2 to 1.0% by weight, still more preferably from 0.3 to 0.7% by weight.

The residual diethylene glycol content of the polyester multifilament yarns can be controlled by appropriately regulating polymerization conditions and melt-spinning (filament-forming) conditions.

In the polyester multifilament warp and weft yarns of the woven fabric of the present invention, the content of the titanium dioxide pigment is preferably restricted to a level of 0.2% by weight or less. When the titanium dioxide pigment content is more than 0.2% by weight, the resultant polyester multifilament yarns sometimes exhibit a reduced heat resistance and thus an undesirably enhanced maximum heat stress, and the resultant air bag exhibits an undesirably increased air permeability and as a reduced burst strength retention after the dry heat aging. More preferably, the content of the titanium dioxide pigment in the polyester multifilament yarns is restricted to a level of 0 to 0.1 by weight, still more preferably, zero.

The polyester multifilament yarns having a titanium dioxide content of 0.2% by weight or less can be produced by appropriately controlling polymerization conditions.

The polyester multifilament warp and weft yarns for the woven fabric of the present invention preferably have, respectively and independently from each other, a crystallinity of 45 to 65% by weight. If the crystallinity is less than 45% by weight, the resultant woven fabric sometimes exhibits an unsatisfactory form-retaining property and an undesirably reduced heat resistance and thus the resultant air bag exhibits an unsatisfactorily increased air permeability and an undesirably reduced burst strength retention after the dry heat-aging. Also, if the crystallinity is more than 65% by weight, the resultant woven fabric sometimes exhibits a low form-retaining property, and thus the resultant air bag exhibits an undesirably reduced softness and flexibility and an undesirably increased air permeability after the dry heat-aging.

More preferably, the crystallinity of the polyester multifilament yarns is restricted to a level of from 48 to 63% by weight, still more preferably from 50 to 60% by weight. The crystallinity of the polyester multifilament yarns can be controlled by appropriately regulating melt-spinning (filament-forming) conditions, drawing conditions and/or heat-setting conditions.

The polyester multifilament warp and weft yarns for the woven fabric of the present invention preferably have, respectively and independently from each other, a crystal size of from 3.0 to 9.0 nm measured at right angles to (100) latice net face of the crystals. If the crystal size is less than 3.0 nm, the resultant woven fabric sometimes exhibits an unsatisfactorily low form-retaining property and an undesirably reduced heat resistance and thus the resultant air bag sometimes has an undesirably increased air permeability and reduced burst strength retention after the dry heat aging. Also, if the crystal size is more than 9.0 nm, the resultant woven fabric sometimes exhibits a low softness and flexibility and a reduced form-retaining property, and thus the resultant air bag exhibits an undesirably enhanced air permeability after the dry heat aging. More preferably, the crystal size of the polyester multifilament yarns is restricted to a level of from 3.5 to 8.5 nm, still more preferably from 4.0 to 8.0 nm. The crystal size of the polyester multifilament yarns at right angles to (100) latice net face of the crystals can be regulated by appropriately controlling the melt-spinning conditions, the drawing conditions and/or the heat-setting conditions.

Further, the polyester multifilament warp and weft yarns for the woven fabric of the present invention preferably have, respectively and independently from each other, a twist multiplier of 2,500 or less. The term "twist multiplier" of a yarn is defined by the following equation:

$$\text{Twist multiplier} = \sqrt{D} \times T$$

wherein D represents a denier of the yarn and T represents a twist number in turns/m of the yarn.

If the twist multiplier is more than 2,500, the resultant woven fabric sometimes exhibits an undesirably enhanced recovering property in volume of the fabric and thus the resultant air bag exhibits an air permeability after the dry heat aging. More preferably, the twist multiplier is restricted to a level of 2,000 or less, still more preferably 1,500 or less, further more preferably 1,000 or less.

Still further, the polyester multifilament warp and weft yarns for the woven fabric of the present invention, preferably have, respectively and independently from each other, an interlace number of 10 to 50 per meter of the yarns. If the interlace number is less than 10 per m, the resultant yarns are sometimes difficult to weave. Also, if the interlace number is more than 50 per m, the resultant woven fabric sometimes exhibits an undesirably enhanced recovering property in volume of the fabric and thus the resultant air bag exhibits an undesirably enhanced air permeability after the dry heat aging. More preferably, the interlace number of the polyester multifilament yarns is restricted to a level of from 15 to 45 per m, still more preferably 20 to 40 per m.

In the polyester multifilament warp and weft yarns for the woven fabric of the present invention, individual filaments preferably have a thickness of 0.5 to 3.0 deniers. If the individual filament thickness is less than 0.5 denier, sometimes fluffs are easily formed in the resultant multifilament yarns, and thus it becomes difficult to weave the yarns into a high density woven fabric, and to provide an air bag having a satisfactorily low air permeability. Also, if the individual filament thickness is more than 3 deniers, the resultant woven fabric sometimes exhibits an undesirably enhanced recovering property in volume and thus the resultant air bag exhibits an undesirably enhanced air permeability after the dry heat aging. More preferably, the individual polyester filament thickness is restricted to a level of from 1.0 to 2.5 deniers, still more preferably from 1.2 to 2.2 deniers.

As mentioned above, the polyester filament woven fabric of the present invention has an air permeability of 0.5 ml/cm$^2$/sec/0.5 inch Aq or less after dry heat-aging at a temperature of 120° C. for 500 hours. If the air permeability of the woven fabric is more than 0.5 ml/cm$^2$/sec/0.5 inch Aq, and the resultant air bag is inflated by blowing an inflation gas thereinto, the gas pressure in the inside of the inflated air bag is rapidly reduced and thus the performance of the air bag is unsatisfactory. Also, since the amount of the inflation gas passed through the air bag at right angles to the faces of the air bag decreases, the inside space in the aircraft or automobile is polluted by fine particles contained in the inflation gas passed through the air bag, and the risk of the occupant being burned increases. Preferably, the air permeability of the polyester filament woven fabric of the present invention after the dry heat-aging at a temperature of 120° C. for 500 hours is restricted to 0.4 ml/cm$^2$/sec/0.5 inch Aq or less.

In another embodiment of the polyester filament woven fabric of the present invention, the woven fabric exhibits a retention of burst strength of 70% or more determined in such a manner that the woven fabric is cut into two circular pieces having a diameter of 700 mm; the circular pieces are superimposed on each other; the circular edge portions of the superimposed pieces are joined together by double thread chain sticks so as to form a circular seam having a diameter of 670 mm and concentric with respect to the superimposed circular pieces, to form a circular bag; the bag is dry heat-aged at a temperature of 120° C. for 500 hours or wet heat-aged at a temperature of 85° C. at a relative humidity of 95% for 500 hours; a circular hole having a diameter of 106 mm is formed at the center of one side piece of the aged bag; 40 liters of a high pressure air compressed under a pressure of 40 kg/cm$^2$G are blown in an instant into the bag through the center hole to measure a burst strength of the aged bag; and the retention of burst strength of the woven fabric is represented by a ratio in % of the burst strength of the aged bag to that of a non-aged bag.

In this embodiment, the resultant air bag prepared from the woven fabric has a retention of burst strength of 70% or more after dry heat aging at a temperature of 120° C. for 500 hours or wet heat aging at a temperature of 85° C. at a relative humidity of 95% for 500 hours. The preparation of the air bag to be subjected to the burst strength test and the measurement of the burst strength of the air bag are carried out in the above-mentioned manner.

If the burst strength retention is less than 70%, and the resultant air bag is stored for a long period of time in an automobile or aircraft, the stored air bag sometimes exhibits a reduced burst strength and thus may be broken when a high pressure inflation is applied thereto. However, the air bag produced from the polyester filament woven fabric of the present invention exhibits a very high stability in burst strength over a long period of time even under a dry and high temperature conditions or high temperature high humidity conditions, and therefore can protect the occupant in the automobile or aircraft from injury.

The burst strength retention is preferably restricted to 80% or more. The polyester multifilament warp and weft yarns for the woven fabric of the present invention preferably have a total thickness of 200 to 600 denier, more preferably 220 to 450 denier.

The polyester resin for forming the polyester multifilament yarns are preferably selected from the group consisting of polyethylene terephthalate polybutylene terephthalate, polyhexylene terephthalate, polyethylene naphthalate polybutylene naphthalate, polyethylene-1,2-bis(phenoxy)ethane-4,4'-dicarboxylate, and copolymers comprising at least one type of recurring units of the above-mentioned polymers, for example, polyethylene terephthalate/isophthalate copolyesters, polybutylene terephthalate/naphthalate copolyesters, polybutylene terephthalate/decanedicarboxylate copolyesters, and mixtures of two or more of the above-mentioned polymers and copolymers. Among them, polyethylene terephthalate resin is preferable for the present invention, because this polymer is well balanced in mechanical properties and fiber-forming properties.

The polyester filament woven fabric of the present invention for air bags is preferably one produced by weaving a plurality of polyester multifilament warp and weft yarns having, respectively and independently from each other, a thermal shrinkage of 3 to 13% at a temperature of 150° C., to provide a gray woven fabric having cover factors in the warp and weft directions of from 1,000 to 1,200 and a difference of 200 or less between the cover factors in the warp direction and that in the weft direction; and dry heat-setting the scoured woven fabric by bringing it into contact with a heat-setting metal roller surface under tension to such an extent that the resultant heat-set woven fabric exhibits an air permeability of 0.5 ml/cm$^2$/sec/0.5 inch Aq or less.

In this embodiment, the polyester multifilament warp and weft yarns for forming a gray woven fabric have a dry thermal shrinkage of 3 to 13%, preferably 3.5 to 12%, at a temperature of 150° C. The shrinkages of the warp and weft yarns may be the same as or different from each other. If the shrinkage is less than 3%, the shrinkage of the resultant gray woven fabric in the scouring step and the heat-setting step is too small and thus the resultant woven fabric exhibits an unsatisfactorily high air permeability and an undesirably increased air permeability after the dry heat aging. Also, if the shrinkage is more than 13%, the resultant woven fabric exhibits an unsatisfactorily uneven air permeability.

Preferably, the polyester multifilament warp and weft yarn have an ultimate elongation of 20% or less, more preferably 19% or less. If the ultimate elongation is more than 20%, sometimes, the resultant gray woven fabric exhibits an unsatisfactorily low thermal shrinkage in the scouring step and thus the resultant woven fabric exhibits an undesirably low ultimate elongation.

In this embodiment, individual polyester filaments in the warp and weft yarns preferably have a thickness of 0.5 to 3.0 deniers, more preferably 1.0 to 2.5 deniers, still preferably 1.2 to 2.2 deniers, and are in a filament number of 140 to 840, more preferably 160 to 600, still more preferably 180 to 400, per yarn. The polyester multifilament warp and yarns have a total thickness preferably of 200 to 600 deniers, more preferably 250 to 550 deniers, still more preferably 300 to 500 deniers, a tensile strength of 9 g/denier, more preferably 9.2 g/denier, a twist multiplier of 2,500 or less, more preferably 1,300 to 2,500 for the warp yarns and 0 for weft yarns.

The polyester filament woven fabric of the present invention preferably has a cover factor of 1,000 to 1,200 both in warp and weft directions thereof. More preferably, the cover factor in the warp direction and the cover factor in the weft direction are as close as possible to each other, still more preferably equal to each other. The term "a cover factor $CF_1$ of a woven fabric in the warp direction thereof" is defined by the following equation:

$$CF_1 = \sqrt{D_1} \times S_2$$

wherein $D_1$ represents a thickness in denier of the warp yarns and $S_1$ represents a density in yarns/inch of the warp yarns in the fabric. Also, the term "a cover factor $CF_2$ of a woven fabric in the weft direction thereof" is defined by the following equation:

$$CF_2 = \sqrt{D_2} \times S_2$$

wherein $D_2$ represents a thickness in denier of the weft yarns and $S_2$ represents a density in yarns/inch of the weft yarns in the fabric.

If the $CF_1$ and/or $CF_2$ is less than 1,200, shrinkage of the woven fabric by a dry heat-setting is not high enough to satisfactory close the gaps between the filament yarns and thus the resultant woven fabric exhibit an unsatisfactory high air permeability after dry heat aging. If the $CF_1$ and/or $CF_2$ is more than 1,200, since the resultant fabric has an undesirably high fiber packing and is difficult to uniformly shrink in the heat-setting step due to a high friction between the filament yarns, the resultant air bag exhibits a reduced burst strength retention after dry or wet heat aging. More preferably, the cover factor $CF_1$ and/or $CF_2$ is restricted to a level of from 1,020 to 1,150.

In the woven fabric of the present invention, the difference $\Delta CF$ between the cover factors $CF_1$ and $CF_2$ in the warp and weft directions is preferably 200 or less. If the difference $\Delta CF$ is more than 200, the warp and weft yarns do not shrink in good balance and thus and excessive stress is remained in the woven fabric. Therefore, the woven fabric obtains an increased air permeability after dry heat aging. Also, the burst strength retention of the woven fabric is reduced by dry or wet heat aging.

The woven fabric of the present invention is not limited to that having a specific weaving structure. Namely, the woven fabric of the present invention preferably has a 1/1 plain weave structure or a 2/2 mat weave structure and may have a 2/1 twill structure, 2/2 twill structure or rip stop weave structure.

Usually, a most preferable weave structure is a plain weave structure which imparts a satisfactorily initial air permeability and a satisfactory stability in air permeability even after aging in dry or wet conditions at a high temperature over a long period of time.

The polyester filament woven fabric of the present invention having a low air permeability of 0.5 ml/cm$^2$/sec/0.5 inch Aq or less after dry heat aging the fabric at a temperature of 120° C. for 500 hours can be produced by applying a woven fabric-shrinking treatment to the woven fabric by using a roll surface-contact type heat-setting machine.

In a typical conventional heat setting system for producing a low air-permeable woven fabric for air bags, a tenter type heat-setting machine, for example, as described in Canadian Patent No. 974,745, was used for a woven fabric under substantially no tension.

In this heat-setting system, a woven fabric having a satisfactorily low air permeability can be produced only when the woven fabric has a specific structure such that the density of warp yarns in the fabric is extremely high, and thus the generation of crimps in the warp yarns can be significantly restricted even under no tension. However, the significant difference in density between the warp yarns and the weft yarns causes the resultant air bag to exhibit a reduced burst strength retention and simultaneously a change in the crimp structure in the weft direction of the woven fabric causes the resultant air bag to exhibit an uneven air permeability, because the crimp structure of the woven fabric in a transversal direction thereof is modified due to the fact that the tension applied to the edge portions of the woven fabric does not become completely zero. Accordingly, by the dry heat aging, the air permeability of the air bag undesirably increases due to the uneven structure of the woven fabric. To obtain a woven fabric having a low air permeability not only before the dry heat aging but also after the dry heat aging, it is necessary to uniformly reduce the crimp structure of the warp and weft yarn filaments as much as possible. Accordingly, it is preferable to apply a heat-setting, by using the roll surface-contact heat-setting machine, to the polyester filament woven fabric at an elevated temperature under a specific tension in the warp direction that is slightly lower than a thermal shrinking force generated in the woven fabric in the warp direction thereof when the woven fabric is brought into contact with the roll surface of the heat setting machine at the elevated temperature, while fully stretching the woven fabric. The woven fabric is tensed in all directions due to the above-mentioned tension generated in the warp direction and a tension generated in the weft direction due to a contact resistance of the weft yarns to the warp yarns, and thus the woven fabric can appropriately shrink in the heat-setting. This appropriate shrinkage of the woven fabric can prevent a generation of an undesirable excessive and uneven crimp structure and thus the resultant woven fabric can obtain a stable air permeability, and a high burst strength retention after dry or wet heat aging.

The roll surface-contact type heat-setting procedure is preferably carried out in at least two steps, namely, in a low temperature step and a high temperature step, to obtain a heat-set woven fabric having a stable and even structure. In a preferable example of the heat setting procedure, a low temperature roll has a temperature of 130° C. to 170° C. and a high temperature roll has a temperature of 160° C. to 220° C. and higher than the temperature of the low temperature roll. More preferably, the heat setting procedure is carried out in at least three steps so as to gradually raise the temperature of the woven fabric by using a heat-setting machine having three or more heating rolls.

The heat-setting is preferably carried out by using a heating roll having a surface temperature in the range as mentioned above at a speed of 5 to 30 m/min for about 10 to 180 seconds.

To obtain the woven fabric of the present invention, it is preferable that the gray woven fabric is scoured to such an extent that the basis weight of the scoured woven fabric is 2 to 15% preferably 3 to 13%, more than the basis weight of the gray woven fabric. Also, the heat-setting is preferably carried out to such an extent that the basis weight of the heat-set woven fabric is 8 to 40%, more preferably 10 to 35%, more than the basis weight of the gray woven fabric. However, too much increase in the basis weight derived from the scouring and heat-setting procedures causes an undesirable unevenness in the properties of the resultant processed woven fabric.

The polyester filament woven fabric of the present invention has an air permeability of 0.5 ml/cm$^2$/sec/0.5 inch Aq or less. If the air permeability of the woven fabric is more than 0.5 ml/cm$^2$/sec/0.5 inch Aq, and the resultant air bag is inflated by blowing an inflation gas thereinto, the gas pressure in the inside of the inflated air bag is rapidly reduced and thus the performance of the air bag is unsatisfactory. Also, since the amount of the inflation gas passed through the air bag at right angles to the faces of the air bag decreases, the inside space in the aircraft or automobile is polluted by fine particles contained in the inflation gas passed through the air bag, and the risk of the occupant being burned increases. Preferably, the air permeability of the polyester filament woven fabric of the present invention is restricted to 0.4 ml/cm$^2$/sec/0.5 inch Aq or less.

Preferably, the polyester multifilament warp and weft yarn have an ultimate elongation of 20% or less, more preferably 19% or less. If the ultimate elongation is more than 20%, sometimes, the resultant gray woven fabric exhibits an unsatisfactorily low thermal shrinkage in the scouring step and/or the heat-setting step, and thus the resultant woven fabric exhibits an undesirably high premeability.

Generally speaking, when a conventional woven fabric is calendered, the resultant calendered woven fabric exhibits a very low initial air permeability, and thus is useful for air bags. The air permeability of the conventional calendered woven fabric, however, is increased to a level similar to that of the corresponding uncalendered woven fabric due to a recovery in volume of the conventional woven fabric with the lapse of time. For this phenomenon, it is assumed that the fabric structure changes over a long period of time, and gaps between the yarns in the woven fabric are enlarged so as to increase the air permeability of the woven fabric. Compared with this, the polyester filament woven fabric of the present invention having the above-mentioned specific performances and the fabric structure thereof is very stable over a long period of time and thus the air permeability thereof can be stably maintained at a low level.

As mentioned above, the polyester filament woven fabric of the present invention has a low maximum heat stress and a low maximum thermal shrinkage of the polyester multifilament warp and weft yarns, and exhibits a low air permeability even after a dry heat-aging at a temperature of 120° C. over 500 hours and a high burst strength retention even after a dry or wet heat aging over a long period of time. Therefore, the polyester filament woven fabric can be used in the non-coated and non-calendered conditions to produce air bags. Namely, the air bag produced from the non-coated and uncalendered woven fabric of the present invention can be left in an automobile or aircraft at a high temperature over a long period of time, without shrinking of the polyester multifilament yarns which shrinking occurs by overcoming the restriction of the yarns to each other, without enhancing the air permeability of the air bags and without decreasing the burst strength retention. Accordingly, when the inflation gas is blown into the air bag, and the high inflation gas pressure is maintained in the inflated air bag, substantially no permeation of the high temperature inflation gas through the air bag, and no bursting of the air bag occurs, and the occupant in the automobile or aircraft is kept safe.

EXAMPLES

The present invention will be further illustrated by way of the following specific examples.

In these examples, the measurements of the properties of filaments, woven fabrics and the evaluation of the air bags were carried out in accordance with the following test methods.

Gas permeability

This was measured by using a gas permeability tester (trademark: FX 3300, made by Textest Co.) having an orifice with a cross-sectional opening area of 100 cm$^2$, under a pressure of 0.5 inch Aq (125 Pa).

Maximum heat stress

This was measured by using a heat stress tester (Type KE-2, trademark, made by Kanebo Engineering K.K.). From a woven fabric to be tested, warp yarns and weft yarns were drawn out. Each yarn was fixed in a testing length of 50 mm on the heat stress tester under an initial load of 0.08 g/denier, and heated at a heating rate of 150° C./minute from room temperature to the melting temperature of the yarn to determine the maximum heat stress of the yarn. The maximum heat stress appeared at a temperature of from 240° C. to 260° C. The maximum heat stress of the yarn was calculated by dividing the measured maximum heat stress by the thickness in denier of the yarn.

Maximum thermal shrinkage

This was measured by the above-mentioned heat stress tester. Warp yarns and weft yarns to be tested were drawn out from the woven fabric. Each yarn was placed in a testing length of 50 mm on the tester under an initial load of 0.08 g/denier, without fixing the yarn on the tester, and heated at heating rate of 150° C./minute from room temperature to the melting temperature of the yarn. The maximum thermal shrinkage of the yarn was calculated by dividing the difference between 50 mm and the minimum length in mm of the shrunk yarn by 50 mm.

Limiting viscosity number

This was determined in a concentration of 1.2 g/100 ml of a polyester multifilament yarn in orthochlorophenol at a temperature of 25° C.

Content of terminal carboxyl groups

A polyester multifilament yarn was dissolved in a concentration of 1.0 g/100 ml in benzyl alcohol at a temperature of 190° C. for 7.5 minutes, and the resultant solution was titrated with 0.1N sodium hydroxide solution in benzyl alcohol in the presence of an indicator consisting of 0.1% phenol red solution, to determine the content of the terminal carboxyl groups.

Content of residual diethylene glycol

A polyester resin was decomposed by hydrazine, and the resultant decomposition product was subjected to a gas chromatography to determine the content of residual diethylene glycol in the polyester resin.

Content of titanium dioxide

A polyester resin was molded. The molded polyester resin was subjected to a fluoro-X-ray analysis to determine a content of metallic titanium and the measured content was converted to a content of titanium dioxide.

Crystallinity

This was measured by a density gradient tube method by using a liquid mixture of n-heptane with tetrachlorocarbon.

Crystal size

The size of a crystal in a direction of at right angles to (100) latice net face of the crystal by a wide angle X-ray diffraction method.

Dry thermal shrinkage

A non-twisted polyester filament yarn was heated at a temperature of 150° C. for 30 minutes while allowing the yarn to freely shrink. The dry thermal shrinkage was calculated in accordance with the following equation:

Dry thermal shrinkage $(\%) = ((L-L_0)/L) \times 100$ wherein L represents a length of non-heat-shrunk yarn and $L_0$ represent a length of heat-shrunk yarn.

Inflation inside pressure of air bag

An air bag having a capacity of about 50 liters for a driver of an automobile was dry heat aged at a temperature of 120° C. for 500 hours, contained in a module, and connected to an inflator made by Morton International, Type 4. The air bag was subjected to an inflation test at room temperature. The inside pressure of the inflated air bag was measured by a strain gauge.

Tensile strength (σ) and ultimate elongation (ε) of woven fabric

These were measured in accordance with Japanese Industrial Standard (JIS) L 1096, Tensile testing method. In this test, the woven fabric specimens had a width of 3 cm, and a testing length of 20 cm, and the stretching speed was 20 cm/minute.

Burn-preventing effect of air bag in inflation

A module containing an about 50 liter air bag was placed in a seat for a driver, and connected to an inflator (made by Morton International, Type 4). The air bag was heated at a temperature of 95° C. for 6 hours or more, and then immediately inflated. A blowing out and escaping condition of the inflation gas through the air bag was observed by using a high speed video recorder. The burn-preventing effect of the air bag was evaluated in two classes as shown below.

Good: The blowing out and escaping of white smoke through the air bag was slight.

Bad: The blowing out and escaping of white smoke through the air bag was significant.

Burst strength

A high pressure air was rapidly blown into an about 50 liter air bag and an inside pressure under which the air bag burst was measured. The burst strength of the air bag was represented by the bursting inside pressure of the air bag.

Burst strength retention

A woven fabric was cut into two circular pieces having a diameter of 70 cm. The two circular pieces were superimposed together, and the circular edge portions of the superimposed circular pieces were joined together by double thread chain sticks so as to form a circular seam having a diameter of 670 mm. This circular seam was concentric with respect to the superimposed circular pieces. A circular bag was provided. The circular bag was subjected to a measurement of a burst strength in which a high pressure air having a pressure of 40 kg/cm$^2$G and a volume of 40 liters was blown in an instant into the bag through a hole formed at the center of one side piece of the bag and having a diameter of 106 mm. The pressure under which the bag was burst was measured by a strain gauge. The burst strength of the bag was represented by the bursting pressure.

The circular bag was subjected to a dry heat aging at a temperature of 120° C. at a relative humidity of zero for 500 hours or a wet heat-aging at a temperature of 85° C. at a relative humidity of 95% for 500 hours.

The aged circular bag was subjected to the same burst strength test as mentioned above.

The burst strength retention of the bag was represented by a ratio in % of the burst strength of the aged bag to that of the non-aged bag.

Example 1

A plain weave fabric was produced from the polyethylene terephthalate multifilament warp and weft yarns having an individual filament thickness of 1.7 deniers, a yarn thickness of 420 deniers, and the properties as shown in Table 1, and scoured.

The scoured woven fabric was heat set by in two steps at a temperature of 150° C. on first heating roll and then at a temperature of 180° C. on second heating rolls.

The resultant woven fabric had cover factors as shown in Table 1.

Also, the woven fabric had air permeabilities before and after the dry heat aging, as shown in Table 1.

Also, the non-aged woven fabric was converted to a 60 liter air bag for a driver seat of an automobile.

The air bag exhibited an inside inflation pressure as shown in Table 1, in the inflation test.

Comparative Examples 1 to 5

In each of Comparative Examples 1 to 5, the same procedures as in Example 1 were carried out with the following exceptions.

The polyester multifilament yarns used had the properties as shown in Table 2.

In some of the comparative examples, the woven fabric was calendered at one side surface at a temperature of 180°

C. under a pressure of 670 kg/cm at a speed of 6 m/minute.

The resultant heat-set woven fabric had the properties as shown in Table 2.

Also, the resultant air bag exhibited the inflation inside pressure shown in Table 2.

In the Tables 1 and 2, the general evaluation of the resultant woven fabric was classified into the following two classes.

Good: The air permeability after the dry heat aging was 0.5 ml/cm²/sec/0.5 inch Aq or less.

Bad: The air permeability after the dry heat aging was more than 0.5 ml/cm/sec/0.5 inch Aq.

TABLE 1

| | | | | Example No. | 1 |
|---|---|---|---|---|---|
| Polyester multifilament yarn | Yarn count | Total thickness | (denier) | | 420 |
| | | Individual filament thickness | (denier) | | 1.7 |
| | | Filament number per yarn | | | 250 |
| | Shrinkage (%) | Dry, 150° C. | | | 5.1 |
| | | in boiling water | | | 2.2 |
| Heat-set woven fabric | Maximum heat stress | | (g/d) | | 0.20 |
| | Maximum thermal shrinkage | | (%) | | 10.0 |
| | Limiting viscosity number | | (dl/g) | | 0.853 |
| | Terminal carboxylic group content | | (equivalent/ton) | | 17.4 |
| | Residual diethylene glycol content | | (wt %) | | 0.60 |
| | Titanium dioxide content | | (wt %) | | 0 |
| | Crystallinity | | (%) | | 53.5 |
| | Crystal size | | (nm) | | 5.5 |
| | Twist multiplier | Warp direction | | | 0 |
| | | Weft direction | | | 0 |
| | Interlace number per m | | | | 30 |
| | Cover factor | Warp direction | | | 1,210 |
| | | Weft direction | | | 1,148 |
| | Calendering | | | | Non |
| | Air permeability (ml/cm²/sec/ 0.5 inch Aq) | Before dry heat aging | | | 0.45 |
| | | After dry heat aging | | | 0.48 |
| Air bag | Inflation inside pressure | | (kg/cm²G) | | 0.21 |
| | General evaluation | | | | Good |

TABLE 2

| | | | | | Comparative Example | | | | |
|---|---|---|---|---|---|---|---|---|---|
| | | | | Example No. | 1 | 2 | 3 | 4 | 5 |
| Polyester multifilament yarn | Yarn count | Total thickness | (denier) | | 420 | 420 | 420 | 420 | 420 |
| | | Individual filament thickness | (denier) | | 1.7 | 1.7 | 1.7 | 1.7 | 1.7 |
| | | Filament number per yarn | | | 250 | 250 | 250 | 250 | 250 |
| | Shrinkage (%) | Dry, 150° C. | | | 5.1 | 5.1 | 5.1 | 5.1 | 5.1 |
| | | in boiling water | | | 2.2 | 2.2 | 2.2 | 2.2 | 2.2 |
| Heat-set woven fabric | Maximum heat stress | | (g/d) | | 0.92 | 0.92 | 0.90 | 0.77 | 0.86 |
| | Maximum thermal shrinkage | | (%) | | 28.4 | 28.4 | 12.0 | 27.4 | 24.7 |
| | Limiting viscosity number | | (dl/g) | | 0.751 | 0.751 | 0.853 | 0.853 | 0.853 |
| | Terminal carboxylic group content | | (equivalent/ton) | | 17.4 | 17.4 | 36.7 | 17.4 | 17.4 |
| | Residual diethylene glycol content | | (wt %) | | 0.60 | 0.60 | 0.60 | 1.63 | 0.60 |
| | Titanium dioxide content | | (wt %) | | 0 | 0 | 0 | 0 | 0.23 |
| | Crystallinity | | (%) | | 53.5 | 53.5 | 53.5 | 53.5 | 53.5 |
| | Crystal size | | (nm) | | 5.5 | 5.5 | 5.5 | 5.5 | 5.5 |
| | Twist multiplier | Warp direction | | | 2,049 | 2,049 | 2,049 | 2,049 | 2,049 |
| | | Weft direction | | | 0 | 0 | 0 | 0 | 0 |
| | Interlace number per m | | | | 30 | 30 | 30 | 30 | 30 |
| | Cover factor | Warp direction | | | 1,210 | 1,210 | 1,210 | 1,210 | 1,210 |
| | | Weft direction | | | 1,148 | 1,148 | 1,148 | 1,148 | 1,148 |
| | Calendering | | | | Applied | Non | Applied | Applied | Applied |
| | Air permeability | Before dry heat aging | | | 0.12 | 0.35 | 0.14 | 0.14 | 0.12 |
| | | After dry heat aging | | | 0.61 | 0.58 | 0.57 | 0.55 | 0.54 |

TABLE 2-continued

|  |  |  | Example No. | Comparative Example 1 | 2 | 3 | 4 | 5 |
|---|---|---|---|---|---|---|---|---|
| Air bag | (ml/cm²/sec/0.5 inch Aq) Inflation inside pressure General evaluation | | (kg/cm²G) | 0.10 Bad | 0.13 Bad | 0.15 Bad | 0.15 Bad | 0.15 Bad |

Examples 2 to 14

In each of Examples 2 to 14, a high density plain weave fabric was produced by the same procedures as in Example 1, except that the polyester multifilament yarns had the properties as shown in Tables 3 and 4. The scoured and heat-set woven fabric was not calendered.

The resultant woven fabric and the 50 liter air bag produced from the woven fabric had the properties as shown in Tables 3 and 4.

In Tables 3 and 4, the general evaluation of the air bag was classified into the following two classes.

Good: The burn-preventing effect was satisfactory and the burst strength was 0.8 kg/cm²G or more.

Bad: The burn-preventing effect was unsatisfactory and the burst strength was less than 0.8 kg/cm²G.

TABLE 3

|  |  |  |  | Example No. | 2 | 3 | 4 | 5 | 6 | 7 | 8 |
|---|---|---|---|---|---|---|---|---|---|---|---|
| Polyester multifilament yarn | Yarn count | Total thickness | | (denier) | 420 | 500 | 380 | 420 | 420 | 420 | 420 |
| | | Individual filament thickness | | (denier) | 1.7 | 2.0 | 1.3 | 1.7 | 1.7 | 1.7 | 1.7 |
| | | Filament number per yarn | | | 250 | 250 | 300 | 250 | 250 | 250 | 250 |
| | Shrinkage (%) | Dry, 150° C. | | | 5.0 | 5.1 | 4.5 | 8.9 | 5.0 | 5.0 | 6.0 |
| | | in boiling water | | | 2.3 | 2.4 | 2.2 | 4.5 | 2.3 | 2.3 | 3.4 |
| | Tensile strength | | | (g/d) | 10.1 | 10.3 | 9.9 | 9.3 | 10.1 | 10.5 | 8.8 |
| | Ultimate elongation | | | (%) | 14.7 | 14.4 | 13.5 | 13.2 | 14.6 | 12.9 | 21.2 |
| Heat set woven fabric | Maximum heat stress | | | (g/d) | 0.20 | 0.70 | 0.15 | 0.20 | 0.20 | 0.20 | 0.20 |
| | Maximum thermal shrinkage | | | (%) | 10.0 | 24.0 | 15.1 | 10.0 | 10.0 | 10.0 | 10.0 |
| | Limiting viscosity number | | | (dl/g) | 0.853 | 0.853 | 0.861 | 0.930 | 0.812 | 0.853 | 0.853 |
| | Terminal carboxylic group content | | | (equivalent/ton) | 17.4 | 15.9 | 15.4 | 6.0 | 34.0 | 17.4 | 17.4 |
| | Residual diethylene glycol content | | | (wt %) | 0.60 | 0.60 | 0.60 | 0.20 | 1.40 | 0.60 | 0.60 |
| | Titanium dioxide content | | | (wt %) | 0 | 0 | 0 | 0 | 0.19 | 0 | 0 |
| | Crystallinity | | | (%) | 53.5 | 54.5 | 53.9 | 53.5 | 53.5 | 64.0 | 47.3 |
| | Crystal size | | | (nm) | 5.5 | 5.3 | 5.4 | 5.5 | 5.5 | 8.5 | 3.6 |
| | Interlace number per m | | | | 30 | 32 | 33 | 30 | 30 | 30 | 30 |
| | Ultimate elongation ε | | | (%) | 34 | 37 | 33 | 43 | 32 | 21 | 41 |
| | Tensile strength σ | | | (kg/3 cm) | 243 | 263 | 220 | 218 | 221 | 262 | 245 |
| | Twist multiplier | Warp direction | | | 2,049 | 2,236 | 1,949 | 2,049 | 2,049 | 0 | 2,049 |
| | | Weft direction | | | 0 | 0 | 0 | 0 | 0 | 0 | 0 |
| | Basis weight | | | (g/m²) | 238 | 252 | 206 | 245 | 235 | 240 | 264 |
| | Cover factor | Warp direction | | | 1,168 | 1,185 | 1,287 | 1,291 | 1,318 | 1,170 | 1,242 |
| | | Weft direction | | | 1,144 | 1,109 | 1,193 | 1,254 | 1,048 | 1,159 | 1,209 |
| | Calendering | | | | Non | Non | Non | Non | Non | Non | Non |
| | Air permeability (ml/cm²/sec/0.5 inch Aq) | Before dry heat aging | | | 0.25 | 0.35 | 0.11 | 0.40 | 0.10 | 0.08 | 0.24 |
| | | After dry heat aging | | | 0.27 | 0.36 | 0.13 | 0.45 | 0.21 | 0.10 | 0.27 |
| Air bag | Burn-preventing effect | | | | Good | Good | Good | Good | Good | Good | Good |
| | Burst strength | | | (kg/cm²G) | 2.2 | 2.4 | 1.9 | 1.9 | 1.8 | 1.8 | 1.9 |
| | General evaluation | | | | Good | Good | Good | Good | Good | Good | Good |

TABLE 4

|  |  |  |  | Example No. | 9 | 10 | 11 | 12 | 13 | 14 | 15 |
|---|---|---|---|---|---|---|---|---|---|---|---|
| Polyester multifilament yarn | Yarn count | Total thickness | | (denier) | 420 | 420 | 420 | 420 | 420 | 420 | 420 |
| | | Individual filament thickness | | (denier) | 4.4 | 5.8 | 1.7 | 1.7 | 1.7 | 1.7 | 1.7 |
| | | Filament number per yarn | | | 96 | 72 | 250 | 250 | 250 | 250 | 250 |
| | Shrinkage (%) | Dry, 150° C. | | | 5.7 | 5.4 | 2.1 | 5.7 | 5.6 | 5.7 | 5.7 |

TABLE 4-continued

|  |  |  | | Example | | | | | | |
|---|---|---|---|---|---|---|---|---|---|---|
|  |  |  | Example No. | 9 | 10 | 11 | 12 | 13 | 14 | 15 |
| | | in boiling water | | 3.0 | 2.9 | 0.8 | 3.0 | 3.1 | 3.2 | 0.7 |
| | Tensile strength | | (g/d) | 10.1 | 10.0 | 8.5 | 8.0 | 10.2 | 10.1 | 8.0 |
| | Ultimate elongation | | (%) | 12.9 | 13.0 | 16.3 | 10.5 | 13.0 | 13.5 | 25.9 |
| Heat set | Maximum heat stress | | (g/d) | 0.30 | 0.30 | 0.29 | 0.30 | 0.40 | 0.21 | 0.22 |
| woven | Maximum thermal shrinkage | | (%) | 11.5 | 11.4 | 10.1 | 11.5 | 11.5 | 10.0 | 10.1 |
| fabric | Limiting viscosity number | | (dl/g) | 0.854 | 0.851 | 0.811 | 0.854 | 0.851 | 0.852 | 0.854 |
| | Terminal carboxylic group content | | (equivalent/ton) | 17.4 | 15.9 | 14.9 | 17.4 | 17.1 | 17.2 | 17.5 |
| | Residual diethylene glycol content | | (wt %) | 0.50 | 0.55 | 0.59 | 1.21 | 0.61 | 0.62 | 0.63 |
| | Titanium dioxide content | | (wt %) | 0 | 0 | 0 | 2.2 | 0 | 0 | 0 |
| | Crystallinity | | (%) | 53.4 | 54.1 | 50.4 | 59.1 | 44.2 | 53.1 | 54.5 |
| | Crystal size | | (nm) | 5.4 | 5.3 | 4.9 | 6.1 | 5.9 | 2.9 | 6.2 |
| | Interlace number per m | | | 25 | 20 | 35 | 15 | 25 | 30 | 9 |
| | Ultimate elongation ε | | | 27 | 26 | 22 | 25 | 27 | 33 | 28 |
| | Tensile strength σ | | (kg/3 cm) | 245 | 231 | 200 | 187 | 189 | 235 | 190 |
| | Twist | Warp direction | | 2,049 | 2,049 | 2,049 | 1,640 | 0 | 2,869 | 2,040 |
| | multiplier | Weft direction | | 0 | 0 | 0 | 0 | 0 | 2,869 | 9 |
| | Basis weight | | (g/m²) | 238 | 238 | 228 | 241 | 245 | 229 | 217 |
| | Cover factor | Warp direction | | 1,168 | 1,099 | 1,168 | 1,168 | 1,351 | 1,168 | 1,167 |
| | | Weft direction | | 1,144 | 1,041 | 1,144 | 1,144 | 1,040 | 1,150 | 1,150 |
| | Calendering | | | Non | Non | Non | Non | Non | Non | Non |
| | Air permeability (ml/cm²/sec/ 0.5 inch Aq) | Before dry heat aging | | 0.78 | 0.91 | 1.0 | 0.40 | 0.30 | 0.82 | 1.30 |
| | | After dry heat aging | | 0.82 | 0.92 | 1.0 | 0.48 | 0.32 | 0.89 | 1.31 |
| Air bag | Burn-preventing effect | | | Good | Good | Good | Good | Good | Good | Good |
| | Burst strength | | (kg/cm²G) | 1.3 | 1.3 | 1.1 | 1.0 | 0.9 | 1.8 | 1.3 |
| | General evaluation | | | Good | Good | Good | Good | Good | Good | Good |

Example 15

Polyethylene terephthalate multifilament yarns were prepared from a polyethylene terephthalate resin having a limiting viscosity number of 0.853 dl/g and a terminal carboxyl group content of 17.4 equivalent/ton.

Warp yarns were provided by twisting the yarns at a twist number of 100 turns/m.

Weft yarns were non-twisted.

A high density plain weave fabric was prepared from the above-mentioned warp and weft yarns by using a water jet weaving machine, at a warp density of 53.2 yarns/25.4 mm and a weft density of 53 yarns/25.4 mm. The fabric had a basis weight of 210 g/m².

The resultant gray woven fabric was scoured and dried at a temperature of 110° C. for one minute. The dried woven fabric had a warp density of 54.8 yarns/25.4 mm, a weft density of 53 yarns/25.4 mm and a basis weight of 216 g/m².

The dried woven fabric was heat set by using a metal cylinder roll heat-setting machine in two steps at a temperature of 155° C. for about one minute on first heating rolls and then at a temperature of 180° C. for about 1.5 minutes on second heating rolls. The resultant heat-set fabric had a warp density of 57 yarns/25.4 mm, a weft density of 55.8 yarns/ 25.4 mm, and a basis weight of 238 g/m². The increase in basis weight of the woven fabric was 2.9% in the drying step, and 13.3% in the heat-setting step.

The warp and weft yarns were drawn out from the heat set woven fabric and subjected to testing. Also, the woven fabric was subjected to the burst strength test in the form of an air bag. Also, the air bag was aged under dry heat or wet heat conditions and then subjected to the burst strength test. The burst strength retention of the air bag was determined from the burst strength of the non-aged fabric and that of the aged fabric. The results are shown in Table 5.

Also, the heat-set woven fabric was converted to a 50 liter air bag and the durability of the air bag was measured and evaluated. The results are shown in Tables 6 and 7.

Examples 16 to 21 and Comparative Examples 6 to 7

In each of Examples 16 to 21 and Comparative Examples 6 to 7, the same procedures as in Example 15 were carried out except that the warp and weft yarns and the woven fabric had the properties as shown in Tables 5 and 6. The resultant air bag exhibited the durability as shown in Tables 5 and 6.

TABLE 5

|  |  |  |  | Example | | | | | |
|---|---|---|---|---|---|---|---|---|---|
|  |  |  | Example No. | 15 | 16 | 17 | 18 | 19 | 20 |
| Polyester filament | Yarn count | Total thickness | (denier) | 420 | 420 | 420 | 420 | 420 | 420 |
| | | Individual filament thickness | (denier) | 1.7 | 1.7 | 1.7 | 1.7 | 1.7 | 1.7 |
| | | Filament number per yarn | | 250 | 250 | 250 | 250 | 250 | 250 |
| Heat-set Woven fabric | Maximum heat stress | | (g/d) | 0.15 | 0.15 | 0.16 | 0.17 | 0.21 | 0.22 |
| | Maximum thermal shrinkage | | (%) | 13.2 | 13.4 | 14.5 | 19.1 | 18.3 | 11.1 |
| | Limiting viscosity number | | (dl/g) | 0.853 | 0.930 | 0.812 | 0.853 | 0.853 | 0.853 |
| | Terminal carboxylic group content | | (equivalent/ton) | 17.4 | 6.0 | 34.0 | 17.4 | 17.4 | 17.4 |
| | Residual diethylene glycol content | | (wt %) | 0.60 | 0.60 | 0.60 | 0.20 | 0.60 | 0.60 |

TABLE 5-continued

|  |  |  |  |  | Example | | | | | |
|---|---|---|---|---|---|---|---|---|---|---|
|  |  |  |  | Example No. | 15 | 16 | 17 | 18 | 19 | 20 |
|  | Titanium dioxide content |  |  | (wt %) | 0 | 0 | 0 | 0 | 0.19 | 0 |
|  | Crystallinity |  |  | (%) | 53.5 | 54.5 | 53.9 | 53.5 | 53.5 | 64.0 |
|  | Crystal size |  |  | (nm) | 5.5 | 5.3 | 5.4 | 5.5 | 5.5 | 8.5 |
|  | Calendering |  |  |  | Non | Non | Non | Non | Non | Non |
|  | Burst strength | Dry heat aging | Before |  | 2.0 | 1.8 | 2.0 | 1.7 | 2.0 | 1.8 |
|  | (kg/cm²G) |  | After |  | 2.0 | 1.8 | 1.8 | 1.7 | 1.8 | 1.8 |
|  |  |  | Retention | (%) | 100 | 100 | 90 | 100 | 90 | 100 |
|  |  | Wet heat aging | Before |  | 2.0 | 1.8 | 2.0 | 1.7 | 2.0 | 1.8 |
|  |  |  | After |  | 1.9 | 1.6 | 1.7 | 1.6 | 1.9 | 1.7 |
|  |  |  | Retention | (%) | 95 | 89 | 85 | 95 | 95 | 95 |
| Air bag | Durability over a long time |  |  |  | Good | Good | Good | Good | Good | Good |

TABLE 6

|  |  |  |  |  | Example | Comparative Example | |
|---|---|---|---|---|---|---|---|
|  |  |  |  | Example No. | 21 | 6 | 7 |
| Polyester multifilament yarn | Yarn count | Total thickness |  | (denier) | 420 | 420 | 420 |
|  |  | Individual filament thickness |  | (denier) | 1.7 | 1.7 | 1.7 |
|  |  | Filament number per yarn |  |  | 250 | 250 | 250 |
| Heat-set Woven fabric | Maximum heat stress |  |  | (g/d) | 0.11 | 0.66 | 0.54 |
|  | Maximum thermal shrinkage |  |  | (%) | 12.9 | 24.3 | 14.9 |
|  | Limiting viscosity number |  |  | (dl/g) | 0.853 | 0.751 | 0.853 |
|  | Terminal carboxylic group content |  |  | (equivalent/ton) | 17.4 | 17.4 | 36.7 |
|  | Residual diethylene glycol content |  |  | (wt %) | 0.60 | 0.60 | 0.60 |
|  | Titanium dioxide content |  |  | (wt %) | 0 | 0 | 0 |
|  | Crystallinity |  |  | (%) | 47.3 | 53.5 | 54.5 |
|  | Crystal size |  |  | (nm) | 3.6 | 5.5 | 5.3 |
|  | Calendering |  |  |  | Non | Non | Non |
|  | Burst strength (kg/cm²G) | Dry heat aging | Before |  | 2.0 | 2.0 | 2.0 |
|  |  |  | After |  | 1.8 | 1.3 | 1.3 |
|  |  |  | Retention | (%) | 90 | 65 | 65 |
|  |  | Wet heat aging | Before |  | 2.0 | 2.0 | 2.0 |
|  |  |  | After |  | 1.8 | 1.2 | 1.2 |
|  |  |  | Retention | (%) | 90 | 60 | 60 |
| Air bag | Durability over a long time |  |  |  | Good | Bad | Bad |

Example 22

A high density gray plain weave fabric was produced by using a water jet/weaving machine, from polyethylene terephthalate multifilament warp and weft yarns having the properties as shown in Table 7.

The gray woven fabric had a cover factor of 1,080 in the warp direction, and of 1,060 in the weft direction, and a basis weight of 199 g/m².

The gray woven fabric was scoured and dried by using a metal roll surface contact type drying machine under tension while applying a tension to the fabric in the warp direction, at a drying temperature of 110° C. for one minute. The dried fabric had a basis weight of 211 g/m².

The dried fabric was heat-set by a metal roll surface contact type heat-setting machine under a tension applied in the warp direction in three steps, namely at a temperature of 155° C. on first heating rolls for about one minute, at a temperature of 165° C. on second heating rolls for one minute and then at a temperature of 180° C. on third heating rolls for 1.5 minutes. The heat-set fabric had a basis weight of 255 g/m². The increase in basis weight of the fabric was 6% in the drying step and 28% in the heat-setting step.

The heat set woven fabric had the air permeability, tensile strength and ultimate elongation as shown in Table 7.

The woven fabric was converted to a 50 liter air bag. This air bag exhibited a burn-preventing effect and a burst strength as shown in Table 7.

Examples 23 to 28 and Comparative Examples 8 to 11

In each of Examples 23 to 28 and Comparative Examples 8 to 11, the same procedures as in Example 22 were carried out except that the polyester multifilament yarns, the gray woven fabric, the dried, heat-set woven fabric and the air bag had the properties as shown in Tables 7 and 8.

TABLE 7

| | | Example No. | | 22 | 23 | 24 | 25 | 26 | 27 | 28 |
|---|---|---|---|---|---|---|---|---|---|---|
| Polyester multifilament yarn | Yarn count | Total thickness | (denier) | 400 | 400 | 400 | 400 | 400 | 470 | 420 |
| | | Individual filament thickness | (denier) | 1.6 | 1.6 | 1.6 | 1.6 | 1.6 | 1.9 | 1.7 |
| | | Filament number per yarn | | 250 | 250 | 250 | 250 | 250 | 250 | 250 |
| | Tensile strength | | (g/d) | 9.5 | 9.1 | 9.5 | 9.5 | 9.5 | 9.5 | 10.1 |
| | Ultimate elongation | | (%) | 12.5 | 19.0 | 12.5 | 12.5 | 12.5 | 12.5 | 13.5 |
| | Dry thermal shrinkage | | (%) | 8.9 | 3.3 | 8.9 | 8.9 | 8.9 | 9.2 | 5.3 |
| Gray woven fabric | Twist multiplier | Warp direction | | 2,000 | 2,000 | 2,400 | 2,000 | 2,000 | 2,168 | 2,049 |
| | | Weft direction | | 0 | 0 | 2,400 | 0 | 0 | 0 | 0 |
| | Cover factor | Warp direction | | 1,080 | 1,080 | 1,000 | 1,200 | 1,080 | 1,062 | 1,107 |
| | | Weft direction | | 1,060 | 1,060 | 1,000 | 1,000 | 1,060 | 1,008 | 1,086 |
| | ΔCF | | | 20 | 20 | 0 | 200 | 20 | 54 | 21 |
| Drying + heat-setting | Machine | | | Heating rolls | Heating rolls | Heating rolls | Heating rolls | Heating rolls | Heating rolls | Heating rolls |
| | Drying temp (°C.) × time (min) | | | 110 × 1.0 | 110 × 1.0 | 110 × 1.0 | 110 × 1.0 | 110 × 1.0 | 110 × 1.0 | 110 × 1.0 |
| | Heat setting Temp (°C.) × temp (min) | 1-st | | 155 × 1.0 | 155 × 1.0 | 155 × 1.0 | 155 × 1.0 | 155 × 1.0 | 155 × 1.0 | 155 × 1.0 |
| | | 2-nd | | 165 × 1.0 | 165 × 1.0 | 165 × 1.0 | 165 × 1.0 | — | 165 × 1.0 | — |
| | | 3-rd | | 180 × 1.5 | 180 × 1.5 | 180 × 1.5 | 180 × 1.5 | 200 × 1.5 | 180 × 1.5 | 200 × 1.5 |
| | Tension in warp direction | | | High | High | High | High | Middle | High | High |
| | Increase in basis weight | | (%) | 28 | 18 | 27 | 27 | 32 | 31 | 35 |
| Heat-set woven fabric | Maximum heat stress | | (g/d) | 0.24 | 0.09 | 0.24 | 0.24 | 0.24 | 0.26 | 0.20 |
| | Maximum thermal shrinkage | | (g/d) | 15.0 | 8.4 | 15.4 | 15.4 | 15.4 | 16.1 | 11.8 |
| | Limiting viscosity number | | (dl/g) | 0.853 | 0.853 | 0.853 | 0.853 | 0.853 | 0.853 | 0.853 |
| | Terminal carboxylic group content | | (equivalent/Ton) | 17.5 | 16.5 | 17.6 | 17.5 | 17.5 | 17.5 | 17.5 |
| | Air permeability (ml/cm²/sec/ 0.5 inch Aq) | Before dry heat aging | | 0.20 | 0.37 | 0.48 | 0.48 | 0.41 | 0.23 | 0.25 |
| | | After dry heat aging | | 0.21 | 0.38 | 0.49 | 0.48 | 0.42 | 0.41 | 0.26 |
| Air bag | Tensile strength | | (kg/3 cm) | 231 | 215 | 232 | 200 | 245 | 250 | 255 |
| | Ultimate elongation | | (%) | 38 | 32 | 37 | 30 | 40 | 39 | 37 |
| | Burn-preventing effect | | | Good | Good | Good | Good | Good | Good | Good |
| | Burst strength | | (kg/cm²G) | 2.0 | 1.9 | 2.0 | 1.6 | 2.2 | 2.2 | 2.2 |
| | General evaluation | | | Good | Good | Good | Good | Good | Good | Good |

TABLE 8

|  |  |  |  | Example No. | 8 | Comparative Example 9 | 10 | 11 |
|---|---|---|---|---|---|---|---|---|
| Polyester multifilament yarn | Yarn count | Total thickness |  | (denier) | 400 | 400 | 400 | 400 |
|  |  | Individual filament thickness |  | (denier) | 1.6 | 1.6 | 1.6 | 1.6 |
|  |  | Filament number per yarn |  |  | 250 | 250 | 250 | 250 |
|  | Tensile strength |  |  | (g/d) | 9.9 | 8.5 | 9.5 | 9.5 |
|  | Ultimate elongation |  |  | (%) | 22.0 | 9.5 | 12.5 | 12.5 |
|  | Dry thermal shrinkage |  |  | (%) | 1.8 | 14.9 | 8.9 | 8.9 |
| Gray woven fabric | Twist multiplier | Warp direction |  |  | 2,000 | 2,000 | 2,000 | 2,000 |
|  |  | Weft direction |  |  | 0 | 0 | 0 | 0 |
|  | Cover factor | Warp direction |  |  | 1,080 | 1,080 | 1,400 | 1,080 |
|  |  | Weft direction |  |  | 1,060 | 1,060 | 800 | 1,060 |
|  | ΔCF |  |  |  | 20 | 20 | 600 | 20 |
| Drying + heat-setting | Machine |  |  |  | Heating rolls | Heating rolls | Heating rolls | Heating rolls |
|  | Drying temp (°C.) × time (min) |  |  |  | 110 × 1.0 | 110 × 1.0 | 110 × 1.0 | 110 × 1.0 |
|  | Heat setting | Temp (°C.) × temp (min) | 1-st |  | 155 × 1.0 | 155 × 1.0 | 155 × 1.0 | — |
|  |  |  | 2-nd |  | 165 × 1.0 | 165 × 1.0 | 165 × 1.0 | 165 × 1.0 |
|  |  |  | 3-rd |  | 180 × 1.5 | 180 × 1.5 | 180 × 1.5 | 180 × 1.5 |
|  | Tension in warp direction |  |  |  | High | High | High | Low |
|  | Increase in basis weight |  |  | (%) | 9 | 45 | 32 | 43 |
| Heat-set woven fabric | Maximum heat stress |  |  | (g/d) | 0.85 | 0.75 | 0.88 | 0.29 |
|  | Maximum thermal shrinkage |  |  | (%) | 24.3 | 27.9 | 28.1 | 18.8 |
|  | Limiting viscosity number |  |  | (dl/g) | 0.861 | 0.882 | 0.798 | 0.851 |
|  | Terminal carboxylic group content |  |  | (equivalent/ton) | 21.3 | 22.5 | 24.9 | 36.1 |
|  | Air permeability (ml/cm²/sec/0.5 inch Aq) | Before dry heat aging |  |  | 0.57 | 0.61 | 0.24 | 0.71 |
|  |  | After dry heat aging |  |  | 1.49 | 1.97 | 0.77 | 0.71 |
|  | Tensile strength |  |  | (kg/3 cm) | 265 | 184 | 145 | 250 |
|  | Ultimate elongation |  |  | (%) | 28 | 40 | 24 | 43 |
| Air bag | Burn-preventing effect |  |  |  | Bad | Bad | Good | Bad |
|  | Burst strength |  |  | (kg/cm²G) | 1.4 | 1.4 | 1.3 | 2.2 |
|  | General evaluation |  |  |  | Bad | Bad | Bad | Bad |

We claim:

1. A non-coated and uncalendered polyester filament woven fabric for air bags produced by (A) weaving a plurality of polyester multifilament warp and weft yarns having respectively and independently from each other, a thermal shrinkage of 3 to 13% at a temperature of 150° C., to provide a gray woven fabric having cover factors in the warp and weft directions of from 1,000 to 1,200 and a difference of 200 or less between the cover factor in the warp direction and that in the weft direction; and (B) dry-heat-setting the woven fabric under tension by at least two steps of roll surface-contact heat-setting procedures wherein in the first step thereof, the woven fabric is brought into contact with a low temperature roll having temperature of 130° C. to 170° C. and in the final step thereof, the woven fabric is brought into contact with a high temperature roll having a temperature of 160° C. to 220° C. and higher than the temperature of the low temperature roll, at a speed of 5 to 30 m/min. for a total heat-setting time of 10 to 180 seconds, to such an extent that the polyester multifilament warp and weft yarns in the resultant heat-set woven fabric exhibit:

(1) a maximum thermal stress of 0.8 g/denier or less determined by heating a specimen yarn fixed to a length of 50 mm from room temperature to a melting temperature of the yarn, under an initial load of 0.08 g/denier at a heating rate of 150° C./minute, (2) a maximum thermal shrinkage of 25% or less determined by heating a specimen yarn having a length of 50 mm from room temperature to the melting temperature of the yarn under an initial load of 0.08 g/denier at a heating rate of 150° C./minute without restricting the thermal shrinkage of the specimen yarn, (3) a limiting viscosity number of from 0.80 to 0.95 dl/g determined in a concentration of 1.2 g/100 ml in o-chlorophenol at a temperature of 25° C. and, (4) a content of thermal carboxyl groups of 5 to 35 equivalents per ton of the polyester yarns, and that the resultant heat-set woven fabric exhibits an air permeability of 0.5 ml/cm²/sec/0.5 inch water or less.

2. The non-coated and uncalendered polyester filament woven fabric as claimed in claim 1, wherein the polyester multifilament warp and weft yarns respectively and independently from each other have a content of residual diethylene glycol of 0.1 to 1.5% by weight and a content of titanium dioxide pigment of 0.2% by weight or less.

3. The non-coated and uncalendered polyester filament woven fabric as claimed in claim 1, wherein the polyester multifilament warp and weft yarns respectively and independently from each other have a crystallinity of 45 to 65% by weight and a crystal size of from 3.0 to 9.0 nm measured at right angles to (100) latice net face of the crystals.

4. The non-coated and uncalendered polyester filament woven fabric as claimed in claim 1, wherein the polyester multifilament warp and weft yarns respectively and independently from each other have a twist multiplier of 2,500 or less and an interlace number of 10 to 50 per m.

5. The non-coated and uncalendered polyester filament woven fabric as claimed in claim 1, wherein the polyester multifilament warp and weft yarns respectively and independently from each other consist of individual polyester filaments each having a thickness of 0.5 to 3.0 deniers.

6. The non-coated and uncalendered polyester filament woven fabric as claimed in claim 1, which woven fabric exhibits an air permeability of 0.5 ml/cm²/sec/0.5 inch water or less, determined after dry heat-aging at a temperature of 120° C. for 500 hours.

7. The non-coated polyester filament woven fabric as claimed in claim 1, which woven fabric exhibits a retention of burst strength of 70% or more determined in such a manner that the woven fabric is cut into two circular pieces having a diameter of 700 mm; the circular pieces are superimposed on each other; the circular edge portions of the superimposed pieces are joined together by double thread chain stitches so as to form a circular seam having a diameter of 670 mm and concentric with respect to the superimposed circular pieces, to form a circular bag; the bag is dry heat-aged at a temperature of 120° C. for 500 hours or wet heat-aged at a temperature of 85° C. at a relative humidity of 95% for 500 hours; a circular hole having a diameter of 106 mm is formed at the center of one side piece of the aged bag; 40 liters of a high pressure air compressed under a pressure of 40 kg/cm$^2$G are blown in an instant into the bag through the center hole to measure a burst strength of the aged bag; and the retention of burst strength of the woven fabric is represented by a ratio in % of the burst strength of the aged bag to that of a non-aged bag.

8. The non-coated and uncalendered polyester filament woven fabric as claimed in claim 1, wherein the polyester multifilament yarns in the gray woven fabric have an ultimate elongation of 20% or less.

* * * * *